(12) United States Patent
Natroshvili et al.

(10) Patent No.: US 8,639,441 B2
(45) Date of Patent: Jan. 28, 2014

(54) VEHICLE NAVIGATION ON THE BASIS OF SATELLITE POSITIONING DATA AND VEHICLE SENSOR DATA

(75) Inventors: Koba Natroshvili, Waldbronn (DE); Cornelius Buerkle, Karlsruhe (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 13/566,621

(22) Filed: Aug. 3, 2012

(65) Prior Publication Data

US 2013/0035855 A1   Feb. 7, 2013

(30) Foreign Application Priority Data

Aug. 3, 2011 (EP) .................................... 11176400

(51) Int. Cl.
*G01C 21/00* (2006.01)
(52) U.S. Cl.
USPC ................................ 701/480; 701/489; 703/2
(58) Field of Classification Search
USPC ......... 701/408, 468, 469, 479, 480, 489, 509, 701/510; 703/2
See application file for complete search history.

(56) References Cited

U.S. PATENT DOCUMENTS

| | | | | |
|---|---|---|---|---|
| 5,343,209 A * | 8/1994 | Sennott et al. | ............ | 342/357.29 |
| 5,957,982 A * | 9/1999 | Hughes et al. | ................... | 701/13 |
| 6,266,584 B1 * | 7/2001 | Hur-Diaz et al. | ................ | 701/13 |
| 6,408,245 B1 * | 6/2002 | An et al. | ........................ | 701/472 |
| 6,453,238 B1 * | 9/2002 | Brodie et al. | .................. | 701/472 |
| 6,643,587 B2 * | 11/2003 | Brodie et al. | .................. | 701/472 |
| 7,289,906 B2 * | 10/2007 | van der Merwe et al. | ..... | 701/472 |
| 7,490,008 B2 * | 2/2009 | Draganov | ...................... | 701/472 |
| 2004/0150557 A1 | 8/2004 | Ford | | |
| 2006/0074558 A1* | 4/2006 | Williamson et al. | ........... | 701/213 |
| 2011/0001663 A1 | 1/2011 | Anand et al. | | |

OTHER PUBLICATIONS

Chang et al, Performance Evaluation of Track Fusion with Information Matrix Filter, IEEE Transactions on Aerospace and Electronic Systems, vol. 38, ISS. 2, 2002, pp. 455-466.*
Eom et al, Hierarchical Object Recognition Algorithm Based on Kalman Filter for Adaptive Cruise Control System Using Scanning Laser, 1999 IEEE 49th Vehicular Technology Conference, 1999, pp. 2343-2347.*
Wagli, "Trajectory Determination and Analysis in Sports by Satellite and Inertial Navigation", Jan. 2009, , pp. 1-6, I, XP002564487, http://biblion.epfl.ch/EPFL/theses/2009/4288/EPFL_TH4288.pdf.

* cited by examiner

*Primary Examiner* — Russell Frejd
(74) *Attorney, Agent, or Firm* — O'Shea Getz P.C.

(57) ABSTRACT

A vehicle navigation system includes a Kalman filter having a first filter receiving satellite positioning data and a second filter receiving vehicle sensor data. The first filter generates a first state vector estimate and a corresponding first state error covariance matrix. The second filter generates a second state vector estimate and a corresponding second state error covariance matrix. A third filter receives the first and second state vector estimates and the first and second state error covariance matrices, and generates a combined state vector estimate and a corresponding combined state error covariance matrix. A prediction processor generates a predicted state vector estimate and a predicted state error covariance matrix from the combined state vector estimate and the combined state error covariance matrix. The predicted state vector estimate and the predicted state error covariance matrix are provided to the first filter, the second filter, and the third filter.

21 Claims, 4 Drawing Sheets

VEHICLE NAVIGATION ON THE BASIS OF SATELLITE POSITIONING DATA AND VEHICLE SENSOR DATA

CLAIM OF PRIORITY

This patent application claims priority from EP Application No. 11 176 400.7 filed Aug. 3, 2011, which is hereby incorporated by reference.

FIELD OF TECHNOLOGY

The present application relates to a method for vehicle navigation and to a corresponding navigation system.

RELATED ART

In vehicle navigation, it is known to determine the position of a vehicle from satellite positioning data. For example, such satellite positioning data may be derived from satellite positioning signals of the global positioning system (GPS) or other satellite based positioning system. In addition, it is also known to use an inertial navigation system for determining the vehicle position. For example, use of an inertial navigation system may be useful if satellite positioning signals cannot be received, such as in tunnels or other buildings.

Moreover, there is also the possibility of combining satellite positioning data with measurements of an inertial navigation system to thereby improve accuracy of position estimation. For example, satellite positioning data and measurements of an inertial navigation system may be combined using a correspondingly designed Kalman filter.

However, implementation of vehicle position estimation using both satellite positioning data and measurements of an inertial navigation system may require use of a rather complex Kalman filter to combine the satellite positioning data and the measurements of the inertial navigation system.

Accordingly, there is a need for techniques which allow for efficiently improving accuracy of position estimation using satellite positioning data.

SUMMARY OF THE INVENTION

According to an embodiment, a method for vehicle navigation is provided. The method comprises obtaining satellite positioning data from a satellite positioning device of a vehicle, e.g., from a GPS receiver. The method also receives vehicle sensor data from a number of sensors of the vehicle. For example, such sensors may be an odometer which measures the velocity of the vehicle and/or a gyroscopic sensor which measures a yaw rate of the vehicle. Further, the vehicle sensor data may also comprise a steering angle of the vehicle, e.g., as measured by a power steering controller of the vehicle. The method further comprises combining the satellite positioning data and the vehicle sensor data by a Kalman filter to obtain a combined state vector estimate of the vehicle. Typically, the combined state vector estimate will comprise a position of the vehicle, e.g., as defined by geographical coordinates, and also a velocity of the vehicle.

According to the method, the Kalman filter comprises a first filter, a second filter, and a third filter. The first filter receives the satellite positioning data and generates a first state vector estimate of the vehicle and a corresponding first state error covariance matrix. The second filter receives the vehicle sensor data and generates a second state vector estimate of the vehicle and a corresponding second state error covariance matrix. The third filter receives the first state vector estimate, the first state error covariance matrix, the second state vector estimate, and the second state error covariance matrix and generates the combined state vector estimate and a corresponding combined state error covariance matrix. The third filter comprises a prediction processor, which generates a predicted state vector estimate on the basis of the combined state vector estimate and generates a predicted state error covariance matrix on the basis of the combined state error covariance matrix. The predicted state vector estimate and the predicted state error covariance matrix may apply to a future state of the vehicle as expected for a next iteration of the Kalman filter. The predicted state vector estimate and the predicted state error covariance matrix are fed back to the first filter, the second filter, and the third filter.

In the first filter the first state vector estimate can thus be determined by updating the fed back predicted state vector estimate with the received satellite positioning data. The first state error covariance matrix can be determined on the basis of the fed back predicted error covariance matrix and a measurement error covariance matrix of the satellite positioning data.

In the second filter, the second state vector estimate can be determined by updating the fed back predicted state vector estimate with the received satellite positioning data. The second state error covariance matrix can be determined on the basis of the fed back predicted state error covariance matrix and a measurement error covariance matrix of the vehicle sensor data.

In the third filter the combined state error covariance matrix can be determined on the basis of the fed back predicted state error covariance matrix. The combined state vector estimate can be determined on the basis of the fed back predicted state vector estimate and the fed back predicted state error covariance matrix.

The prediction processor of the third filter may be based on a state transition model with a linear state transition matrix.

According to a further embodiment, a navigation system for a vehicle is provided. The navigation system comprises a satellite positioning device, e.g., a GPS receiver, configured to obtain satellite positioning data. Further, the navigation system comprises a Kalman filter. The Kalman filter is configured to obtain a combined state vector estimate of the vehicle by combining the satellite positioning data and vehicle sensor data received from a number of vehicle sensors of the vehicle. The Kalman filter comprises a first filter, a second filter, a third filter, and a feedback arrangement. The first filter is configured to receive the satellite positioning data and generate a first state vector estimate of the vehicle and a corresponding first state error covariance matrix. The second filter is configured to receive the vehicle sensor data and generate a second state vector estimate of the vehicle and a corresponding second state error covariance matrix. The third filter is configured to receive the first state vector estimate, the first state error covariance matrix, the second state vector estimate, and the second state error covariance matrix and generate the combined state vector estimate and a corresponding combined state error covariance matrix. The third filter comprises a prediction processor configured to generate a predicted state vector estimate on the basis of the combined state vector estimate and a predicted state error covariance matrix on the basis of the combined state error covariance matrix. The predicted state vector estimate and the predicted state error covariance matrix may apply to a future state of the vehicle as expected for a next iteration of the Kalman filter. The feedback arrangement of the Kalman filter is configured to feed back the predicted state vector estimate and the predicted state error covariance matrix to the first filter, the second filter, and the third filter.

The navigation system may be configured to perform according to the method as explained above.

According to further embodiment, a vehicle is provided. The vehicle comprises a navigation system as explained above and a number of vehicle sensors configured to provide the vehicle sensor data, e.g., an odometer configured to measure a velocity of the vehicle, a gyroscopic sensor configured to measure a yaw rate of the vehicle, and/or a power steering controller of the vehicle configured to measure a steering angle of the vehicle.

In the above embodiments, positioning accuracy on the basis of the satellite positioning data can be efficiently improved by combining the satellite positioning data with the vehicle sensor data. It is possible to reuse vehicle sensor data as provided by existing vehicle sensors, e.g., an odometer or a sensor for measuring the steering wheel angle as provided in a power steering controller. In addition, simple gyroscopic sensors may be used, such as a gyroscopic sensor for measuring the yaw rate. The structure of the Kalman filter allows for efficiently combining the satellite positioning data and the vehicle sensor data. In particular, the first filter and the second filter do not need to be implemented as complete Kalman filters with prediction of future state vectors and corresponding state error covariance matrices. In addition, the feedback of the predicted state vector estimate and the predicted state error covariance matrix from the third filter to the first filter, the second filter, and the third filter allows for obtaining a global optimum of the combined state vector estimate.

Further embodiments and features thereof, as well as accompanying advantages, will be apparent from the following detailed description of embodiments in connection with the drawings.

These and other objects, features and advantages of the present invention will become apparent in light of the detailed description of the best mode embodiment thereof, as illustrated in the accompanying drawings. In the figures, like reference numerals designate corresponding parts.

DETAILED DESCRIPTION OF THE INVENTION

In the following, embodiments of the invention will be described with reference to the drawings. It should be noted that features of different embodiments as described herein may be combined with each other as appropriate.

Figure 1:
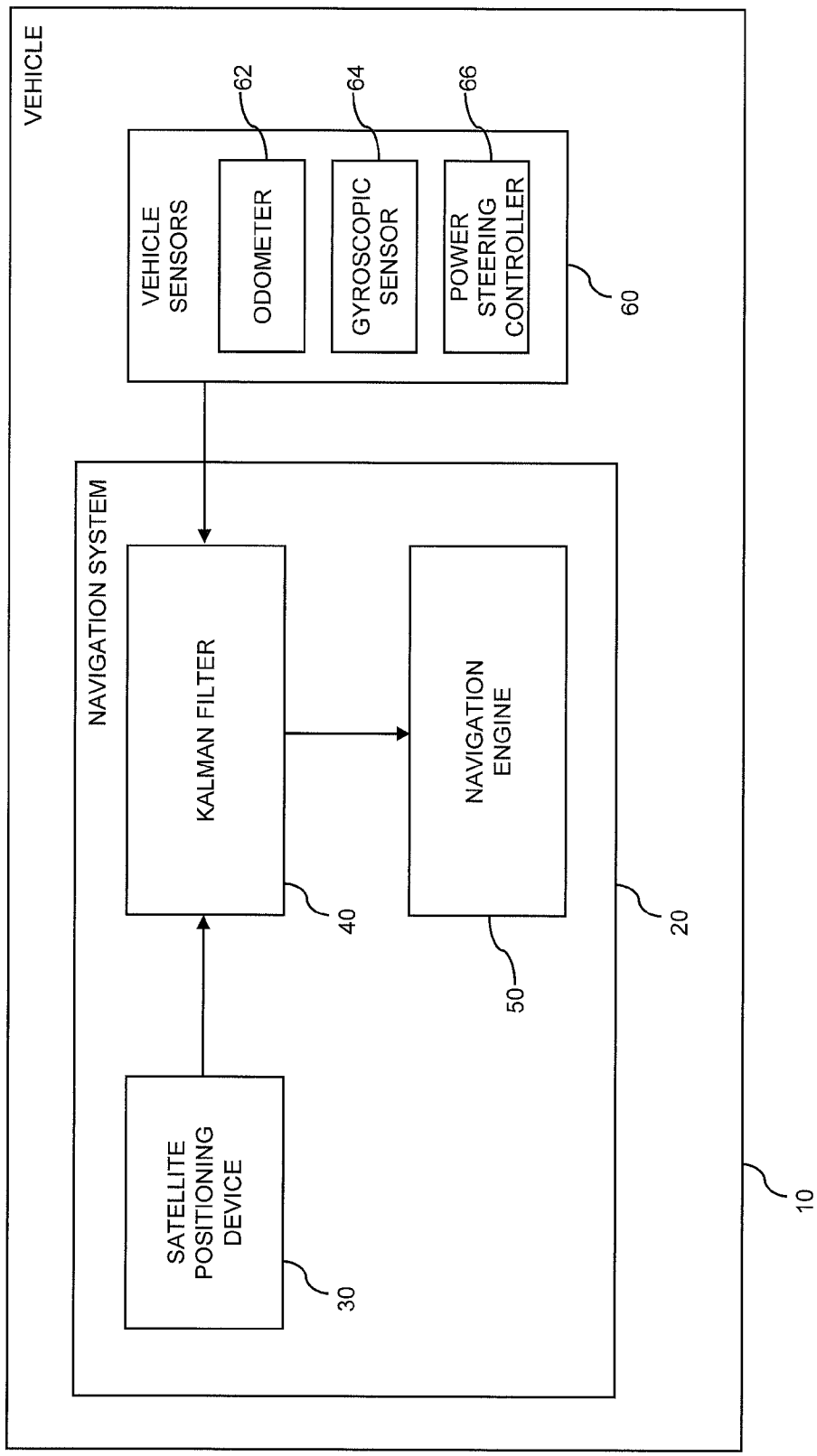
FIG. 1 is a schematic block diagram illustrating a vehicle with a navigation system according to an embodiment of the invention.

FIG. 1 schematically illustrates a vehicle 10 with a navigation system 20 according to an embodiment of the invention. As illustrated, the navigation system 20 includes a satellite positioning device 30 (e.g., a GPS receiver) a Kalman filter 40, and a navigation engine 50. The vehicle 10 further includes a plurality of vehicle sensors 60, in the illustrated example an odometer 62, a gyroscopic sensor 64, and a steering angle sensor of a power steering controller 66.

The satellite positioning device 30 is configured to obtain satellite positioning data. For example, the satellite positioning device 30 may evaluate satellite positioning signals so as to measure coordinates of the vehicle, a velocity of the vehicle, and/or a heading angle of the vehicle. These measurements may be represented in the satellite positioning data in the form of a position vector and a velocity vector.

The vehicle sensors are configured to obtain various measurements concerning the state of motion of the vehicle 10. For example, the odometer 62 may be configured to measure the velocity of the vehicle. The gyroscopic sensor 64 may be configured to measure a yaw rate of the vehicle 10. In addition, the steering angle sensor of the power steering controller 66 may be configured to measure a steering angle of the vehicle 10, which is related to the heading angle of the vehicle 10.

As further illustrated in FIG. 1, the Kalman filter 40 receives the satellite positioning data from the satellite positioning device 30 and also receives the vehicle sensor data from the vehicle sensors 60. The Kalman filter 40 combines the satellite positioning data and the vehicle sensor data to obtain a combined state vector estimate of the vehicle 10. As illustrated in FIG. 1, the combined state vector estimate obtained by the Kalman filter 40 may be supplied to the navigation engine 50 of the navigation system 20. The navigation engine 50 may be for example used the combined state vector estimate for displaying the position of the vehicle 10 to a driver, for calculating a route from the present position of the vehicle 10 to a desired destination, or for other navigation related purposes. Since the combined state vector estimate is based on both the satellite positioning data and the vehicle sensor data, it has an improved accuracy as compared to a state vector estimate on the basis of the satellite positioning data alone.

Figure 2:
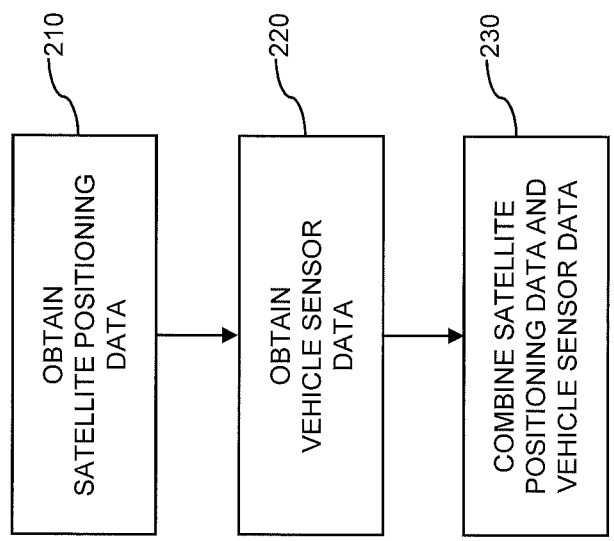
FIG. 2 shows a flow chart for illustrating a method according to an embodiment of the invention.

FIG. 2 schematically illustrates a method of vehicle navigation according to an embodiment of the invention. For example, the method may be implemented in a navigation system 20 as illustrated in FIG. 1. Alternatively, it may also be implemented independently therefrom or in some other system.

At step 210, satellite positioning data are obtained, e.g., by a satellite positioning device such as the satellite positioning device 30 of FIG. 1. The satellite positioning data typically represent a position of the vehicle in the form of geographical coordinates and may also include a velocity and heading direction of the vehicle, e.g., in the form of a velocity vector.

At step 220, vehicle sensor data are obtained. For example, the vehicle sensor data may be obtained from vehicle sensors as illustrated in FIG. 1, e.g., from an odometer, from a gyroscopic sensor, or from a steering angle sensor of a power steering controller. The odometer may be used to provide a velocity of the vehicle. The gyroscopic sensor may be used to proved a yaw rate of the vehicle. The steering angle sensor of power steering controller may be used to provide a steering angle of the vehicle.

At step 230, the satellite positioning data and the vehicle sensor data are combined by a Kalman filter.

The Kalman filter as used in the navigation system 20 of FIG. 1 and the method of FIG. 2 includes a first filter, a second filter, and a third filter. The first filter receives the satellite positioning data and generates a first state vector estimate of the vehicle and a corresponding first state error covariance matrix. The second filter receives the vehicle sensor data and generates a second state vector estimate of the vehicle and a corresponding second state error covariance matrix. The third filter receives the first state vector estimate, the first state error covariance matrix, the second state vector estimate, and the second state error covariance matrix and generates a combined state vector estimate and a corresponding combined state error covariance matrix therefrom. The third filter comprises a prediction processor implemented on the basis of a state transition model. The prediction processor generates a predicted state vector estimate on the basis of the combined state vector estimate. Further, the prediction processor generates a predicted state error covariance matrix on the basis of the combined state error covariance matrix. The predicted state vector estimate and the predicted state error covariance matrix are fed back to the first filter, the second filter, and the third filter.

Accordingly, in this Kalman filter the first filter may determine the first state vector estimate by updating the fed back predicted state vector estimate with the received satellite positioning data. Further, the first filter may determine the first state error covariance matrix on the basis of the fed back predicted state error covariance matrix and a measurement error covariance matrix of the satellite positing data. Similarly, the second filter may determine the second state vector estimate by updating the fed back predicted state vector estimate with the received vehicle sensor data. Further, the second filter may determine the second state error covariance matrix on the basis of the fed back predicted state error covariance matrix and a measurement error covariance matrix of the vehicle sensor data. The third filter may determine the combined state error covariance matrix on the basis of the fed back predicted state error covariance matrix. Further, the third filter may determine the combined state vector estimate on the basis of the fed back predicted state vector estimate and the fed back predicted state error covariance matrix. The state transition model used by the prediction processor may be based on a linear state transition matrix.

Further details of the Kalman filter as used in the navigation system 20 of FIG. 1 and the vehicle navigation method of FIG. 2 will be explained in the following.

For these explanations, a state space model is assumed in which a state vector is given by $$x = \begin{bmatrix} x_1 \\ x_2 \\ x_3 \\ x_4 \end{bmatrix} = \begin{bmatrix} x \\ \dot{x} \\ y \\ \dot{y} \end{bmatrix}. \quad (1)$$

Accordingly, the state vector includes a position in a x-direction denoted by x, a velocity in the x-direction, denoted by $\dot{x}$, a position in a y-direction, denoted by y, and a velocity in the y-direction, denoted by $\dot{y}$.

The state space model may be expressed in continuous form by $$\dot{x} = F \cdot x + G \cdot u + w \quad (2)$$

or $$\begin{bmatrix} x \\ \dot{x} \\ y \\ \dot{y} \end{bmatrix}' = \begin{bmatrix} 0 & 1 & 0 & 0 \\ 0 & 0 & 0 & 0 \\ 0 & 0 & 0 & 1 \\ 0 & 0 & 0 & 0 \end{bmatrix} \cdot \begin{bmatrix} x \\ \dot{x} \\ y \\ \dot{y} \end{bmatrix} + \ldots . \quad (3)$$

In equation (2), the matrix F describes transitions of the state vector on the basis of a physical model for motion of the vehicle. The matrix G describes the influence of disturbances represented by a vector u, and the vector w describes a noise component.

As can be seen from equation (3), a state transition matrix in discrete form can be written as $$\varphi = \begin{bmatrix} 1 & \Delta t & 0 & 0 \\ 0 & 1 & 0 & 0 \\ 0 & 0 & 1 & \Delta t \\ 0 & 0 & 0 & 1 \end{bmatrix}, \quad (4)$$

where $\Delta t$ denotes a time interval between two discrete states.

An error covariance matrix corresponding to the state transition matrix $\varphi$ can be expressed as $$Q = W \begin{bmatrix} \frac{\Delta t^3}{3} & \frac{\Delta t^2}{2} & 0 & 0 \\ \frac{\Delta t^2}{2} & \Delta t & 0 & 0 \\ 0 & 0 & \frac{\Delta t^3}{3} & \frac{\Delta t^2}{2} \\ 0 & 0 & \frac{\Delta t^2}{2} & \Delta t \end{bmatrix}. \quad (5)$$

As mentioned above, two different types of measurement data are received by the Kalman filter.

The first type of measurement data are the satellite positioning data which can be expressed by a vector $$z_1 = \begin{bmatrix} x \\ y \\ v \\ \vartheta \end{bmatrix}, \quad (6)$$

in which x denotes the position along the x-direction, y denotes the position along the y-direction, v denotes the absolute value of the velocity, and θ denotes the heading angle of the vehicle.

The second type of measurement data are the vehicle sensor data, which can be expressed by a vector $$z_2 = \begin{bmatrix} v \\ \vartheta \end{bmatrix}, \quad (7)$$

in which v is the absolute value of the velocity and $\dot{\theta}$ is the yaw rate of the vehicle.

Here, it should be noted that the vector $z_2$ of equation (7) is merely an example of vehicle sensor data which can be used in embodiments of the invention. For example, the steering angle may be used as an additional measurement value or as an alternative to one of the measurement values in the vector $z_2$, e.g., as a replacement of the yaw rate $\dot{\theta}$.

It can be seen that there exist the following relations between the measurement values of equations (6) and (7) and the state vector of equation (1):

$$v = \sqrt{\dot{x}^2 + \dot{y}^2} \quad (8)$$

$$\vartheta = \arctan\left(\frac{y}{x}\right). \tag{9}$$

These relations are non linear. Accordingly, measurement matrices mapping the measurement vectors $z_1$ and $z_2$ to the state vector space can be expressed in Jacobi matrix form as:

$$H_1 = \begin{bmatrix} 1 & 0 & 0 & 0 \\ 0 & 0 & 1 & 0 \\ 0 & \dfrac{x_2}{\sqrt{(x_2^2+x_4^2)}} & 0 & \dfrac{x_4}{\sqrt{(x_2^2+x_4^2)}} \\ 0 & -\dfrac{x_4}{x_2^2+x_4^2} & 0 & \dfrac{x_2}{x_2^2+x_4^2} \end{bmatrix} \tag{10}$$

and $$H_2 = \begin{bmatrix} 0 & \dfrac{x_2}{\sqrt{x_2^2+x_4^2}} & 0 & \dfrac{x_4}{\sqrt{x_2^2+x_4^2}} \\ 0 & -\dfrac{x_4}{x_2^2+x_4^2} & 0 & \dfrac{x_2}{x_2^2+x_4^2} \end{bmatrix}. \tag{11}$$

Figure 3:
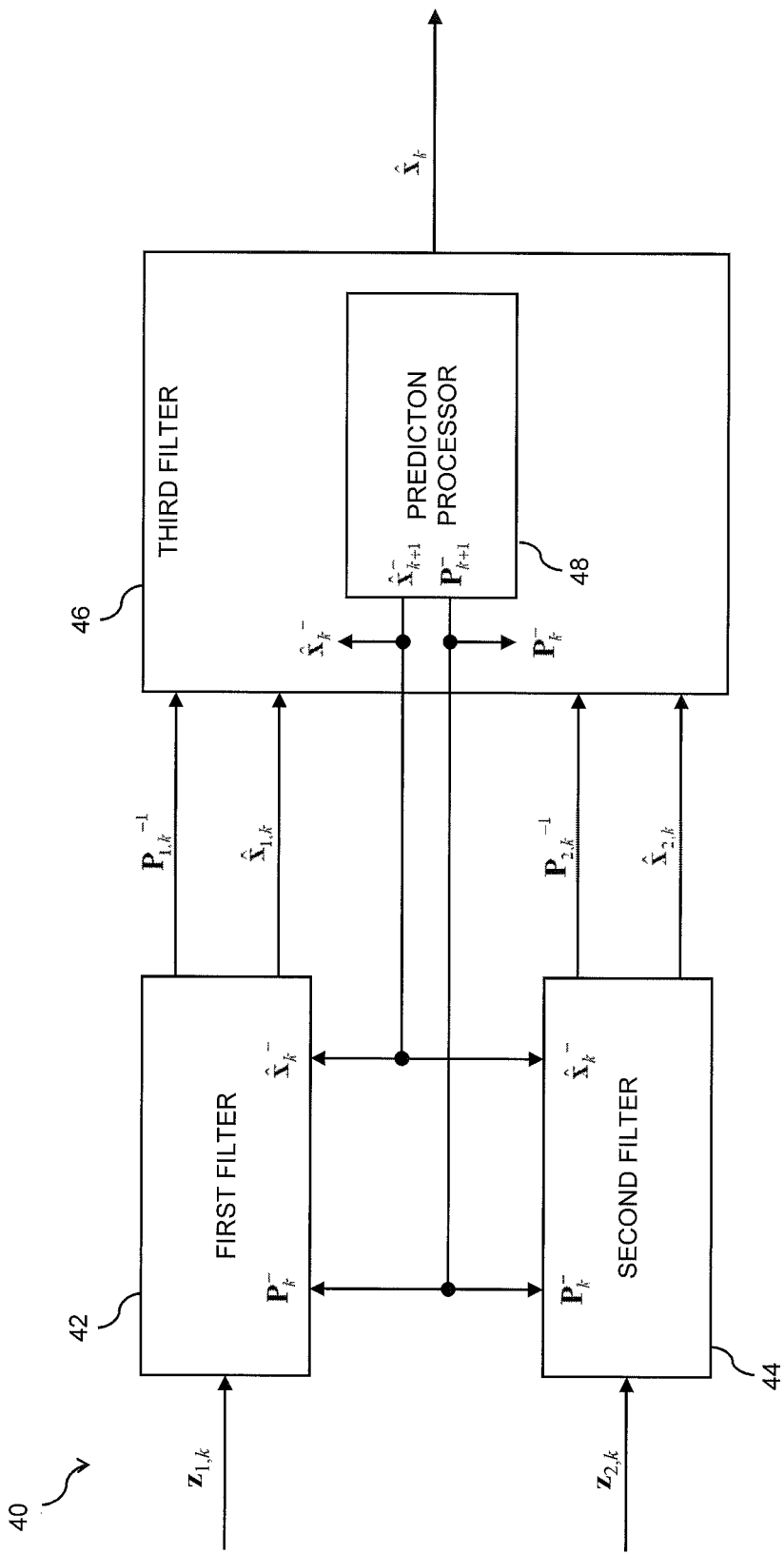
FIG. 3 schematically illustrates a Kalman filter according to an embodiment of the invention.

The operation of the Kalman filter will now be further explained by referring to the block diagram of FIG. 3, in which the Kalman filter 40 is illustrated with the first filter 42, the second filter 44, and the third filter 46. In addition, also the prediction processor 48 of the third filter is illustrated. As further explained in the following, the Kalman filter 40 operates in an iterative manner, an index of the iteration step being denoted by k.

As shown in FIG. 3, the first filter 42 receives the satellite positioning data corresponding to the k-th iteration represented by measurement vector $z_{1,k}$. The first filter determines a first state error covariance matrix according to $$P_{1,k}^{-1} = (P_k^-)^{-1} + H_{1,k}^T R_1^{-1} H_{1,k} \tag{12}$$

and a first state vector estimate according to $$\hat{x}_1 = P_{1,k}((P_k^-)^{-1}\hat{x}_k^- + H_{1,k}^T R_1^{-1} z_{1,k}) \tag{13}$$

Here, $H_{1,k}$ denotes the first measurement matrix, as calculated according to equation (10), in iteration k. Further, $H_{1,k}^T$ denotes the transposed first measurement matrix. $R_1$ denotes a first measurement error matrix representing measurement errors in obtaining the satellite positioning data. $P_k^-$ represents a predicted state error covariance matrix, and $\hat{x}_k^-$ represents a predicted state vector estimate. The first filter 42 obtains the predicted state error covariance matrix $P_k^-$ and the predicted state vector estimate $\hat{x}_k^-$ via feedback from the third filter 46.

Alternatively, the operation of the first filter 42 can also be expressed by first calculating a first Kalman gain according to $$K_{1,k} = P_{1,k} H_{1,k}^T R_1^{-1} \tag{14}$$

and calculating the first state vector estimate according to $$\hat{x}_{1,k} = P_{1,k}((P_k^-)^{-1}\hat{x}_k^- + H_{1,k}^T R_1^{-1} z_{1,k}). \tag{15}$$

The calculations of equations (13) and (15) correspond to an updating of the predicted state vector estimate $\hat{x}_k^-$ with the received satellite positioning data.

As shown in FIG. 3, the second filter 44 receives the vehicle sensor data corresponding to the k-th iteration represented by measurement vector $z_{2,k}$. The second filter determines a second state error covariance matrix according to $$P_{2,k}^{-1} = (P_k^-)^{-1} + H_{2,k}^T R_2^{-1} H_{2,k} \tag{16}$$

and a second state vector estimate according to $$\hat{x}_2 = P_{2,k}((P_k^-)^{-1}\hat{x}_k^- + H_{2,k}^T R_2^{-1} z_{2,k}) \tag{17}$$

Here, $H_{2,k}$ denotes the second measurement matrix, as calculated according to equation (11), in iteration k. Further, $H_{2,k}^T$ denotes the transposed second measurement matrix. $R_2$ denotes a second measurement error matrix representing measurement errors in obtaining the satellite positioning data. $P_k^-$ represents a predicted state error covariance matrix, and $\hat{x}_k^-$ represents a predicted state vector estimate. The second filter 44 obtains the predicted state error covariance matrix $P_k^-$ and the predicted state vector estimate $\hat{x}_k^-$ via feedback from the third filter 46.

Alternatively, the operation of the second filter 44 can also be expressed by first calculating a second Kalman gain according to $$K_{2,k} = P_{2,k} H_{2,k}^T R_2^{-1} \tag{18}$$

and calculating the second state vector estimate according to $$\hat{x}_2 = P_{2,k}((P_k^-)^{-1}\hat{x}_k^- + H_{2,k}^T R_2^{-1} z_{2,k}). \tag{19}$$

The calculations of equations (17) and (19) correspond to an updating of the predicted state vector estimate $\hat{x}_k^-$ with the received vehicle sensor data.

As further shown in FIG. 3, the third filter 46 receives the first state vector estimate $\hat{x}_{1,k}$ and the corresponding first state error covariance matrix $P_{1,k}$ from the first filter 42. Further, the third filter 46 receives the second state vector estimate $\hat{x}_{2,k}$ and the corresponding second state error covariance matrix $P_{2,k}$ from the second filter 44.

The third filter 46 determines a combined state error covariance matrix according to $$P_k^{-1} = P_{1,k}^{-1} + P_{2,k}^{-1} - (P_k^-)^{-1} \tag{20}$$

and a combined state vector estimate according to $$\hat{x}_k = P_k(P_{1,k}^{-1}\hat{x}_{1,k} + P_{2,k}^{-1}\hat{x}_{2,k} - (P_k^-)^{-1}\hat{x}_k^-) \tag{21}$$

Since equations (20) and (21) are based on the inverse of the first state error covariance matrix $P_{1,k}^{-1}$ and the inverse of the second state error covariance matrix $P_{2,k}^{-1}$, these may be supplied from the first and second filters 42, 44 in inverted form, as indicated by the annotations in FIG. 3. In this way, multiple inversions can be avoided.

As can be seen, also equations (20) and (21) are based on the predicted state vector estimate $\hat{x}_k^-$ and the corresponding predicted state error covariance matrix $P_k^{-1}$. The third filter 46 receives these as local feedback parameters from the prediction processor 48.

The prediction processor 48 operates on the basis of a state transition model as explained above and calculates the predicted state vector estimate for the next iteration according to $$\hat{x}_{k+1}^- = \phi \hat{x}_k \tag{22}$$

and calculates the predicted state error covariance matrix for the next iteration according to $$P_{k+1}^- = \phi P_k \phi^T + Q \tag{23}$$

Further, the third filter 46 supplies the predicted state vector estimate $\hat{x}_{k+1}^-$ for the next iteration and the predicted state error covariance matrix $P_{k+1}^-$ to the first filter 42 and the second filter 44. The predicted state vector estimate $\hat{x}_{k+1}^-$ and the predicted state error covariance matrix $P_{k+1}^-$ can therefore be used in each of the filters 42, 44, 46 in the operations of the next iteration step, i.e., of iteration k+1.

In the above calculations, it should be noted that the measurement matrices $H_1$ and $H_2$ are to be calculated on the basis of the predicted state vector estimate $\hat{x}_k^-$ as well, using the expressions of equations (10) and (11). Further, the measurement error covariance matrices $R_1$ and $R_2$ can be statically determined, i.e., assuming that measurement errors occur independently from each other, which would result in a diagonal structure of these matrices in which the diagonal elements are variances of the measurement errors corresponding to the respective components of the measurement vector. Further, it is to be understood that at a starting point of the iterative Kalman filtering process, starting values need to be set appropriately. In particular, a starting value of the predicted state vector estimate and a starting value of the predicted state error covariance matrix may be set. Such starting values may for example be based on initial satellite positioning data and appropriate assumptions for the measurement errors of the satellite positioning data.

Figure 4:
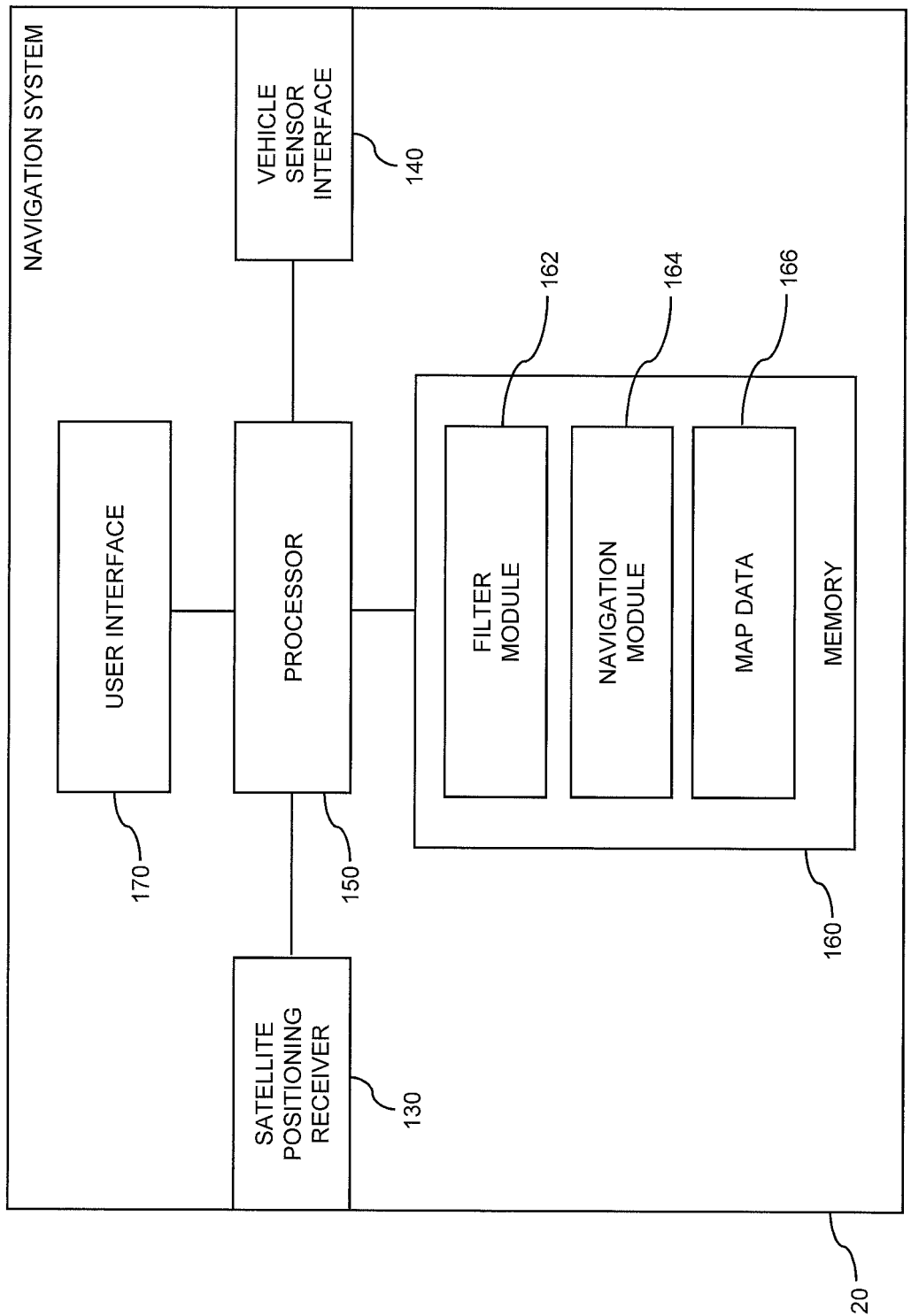
FIG. 4 schematically illustrates an exemplary implementation of a navigation system according to an embodiment of the invention.

The Kalman filter as used in the above described embodiments may be implemented by using correspondingly configured computer program code to be executed by a processor. FIG. 4 schematically illustrates a corresponding processor-based implementation of the navigation system 20.

In this implementation, the navigation system 20 comprises a satellite positioning receiver, e.g., a GPS receiver, a vehicle sensor interface, e.g., implemented by a vehicle bus system, such as the CAN (Controller Area Network) bus. Further, the navigation system 20 comprises a memory 160 storing software code modules and/or data to be used by the processor 150. Further, the navigation system 20 of the illustrated implementation comprises a user interface 170.

The satellite positioning receiver 130 has the purpose of receiving satellite positioning signals and generating signal processing data therefrom, e.g., in the form of pseudo-ranges, geographical coordinates, velocities and/or heading angles of the vehicle. The satellite positioning receiver supplies the satellite positioning data to the processor 150. Here, it is to be understood that the processor 150 may perform further conditioning of the satellite positioning data, e.g., conversion of pseudo-ranges to geographical coordinates, velocities, and/or heading angles.

The vehicle sensor interface 140 is configured to receive vehicle sensor data from various types of vehicle sensors, such as an odometer, a gyroscopic sensor, and/or a steering angle sensor of a power steering controller. Accordingly, the vehicle data may comprise a velocity as measured by an odometer, a yaw rate as measured by a gyroscopic sensor, and/or a steering angle as measured by a power steering controller of the vehicle.

The user interface 170 may be configured to implement various types of interaction with a user. For this purpose, the user interface 170 may comprise a graphical or text display, e.g., for displaying navigation information to a vehicle user, an acoustic output device, such as a loudspeaker, e.g., for outputting acoustic navigation instructions to the vehicle user, and/or an input device for receiving inputs from the vehicle user.

The memory 160 may include a read-only memory (ROM), e.g., a flash ROM, a random-access memory (RAM), e.g., a dynamic RAM (DRAM) or static RAM (SRAM), a mass storage, e.g., a hard disk or solid state disk, or the like. As mentioned above, the memory 160 may include suitably configured program code to be executed by the processor 150 and data to be used by the processor 150. In this way, the navigation system 20 may be configured to operate as explained in connection with FIGS. 1-3. In particular, as illustrated in FIG. 4, the memory 160 may include a filter module 162 so as to implement the above-described functionalities of the Kalman filter 40. Further, the memory 160 may include a navigation module 164 so as to implement various types of navigation functions, such as calculating routes to desired destinations, displaying the vehicles current position in a map representation, or the like. Further, the memory 160 may include map data 166 which may be used by the processor 150 for implementing navigation functions.

It is to be understood that the implementation of the navigation system 20 as illustrated in FIG. 4 is merely schematic and that the navigation system 20 may actually include further components, which, for the sake of clarity, have not been illustrated, e.g., further interfaces. For example, such a further interface could be used to receive data from external sources, such as online traffic information or updated map data. Also, it is to be understood that the memory 160 may include further types of program code modules which have not been illustrated, e.g., program code modules for implementing known types of navigation functions. According to some embodiments, a computer program product may be provided or implementing concepts according to the embodiments as explained above, i.e. by providing program code to be stored in the memory 160. For example, such program code could be provided on a storage medium.

It should be noted that the examples and embodiments as explained above have the purpose of illustrating concepts according to some embodiments of the present invention and are susceptible to various modifications. For example, the concepts as explained above may be used to combine satellite positioning data with vehicle sensor data from any number of vehicle sensors, which may include the examples of vehicle sensor data as mentioned above or may be different therefrom. Also, it is to be understood that details of the calculations in the different components of the Kalman filter may be modified as appropriate, e.g., to take into account a refined measurement error model.

Although the present invention has been illustrated and described with respect to several preferred embodiments thereof, various changes, omissions and additions to the form and detail thereof, may be made therein, without departing from the spirit and scope of the invention.

What is claimed is:
1. A method for vehicle navigation, comprising:
   obtaining satellite positioning data from a satellite positioning device of a vehicle;
   obtaining vehicle sensor data from a number of sensors of the vehicle; and
   combining the satellite positioning data and the vehicle sensor data by a Kalman filter to obtain a combined state vector estimate of the vehicle;
   wherein the Kalman filter comprises
      a first filter which receives the satellite positioning data and generates a first state vector estimate of the vehicle and a corresponding first state error covariance matrix,
      a second filter which receives the vehicle sensor data and generates a second state vector estimate of the vehicle and a corresponding second state error covariance matrix, and
      a third filter which receives the first state vector estimate, the first state error covariance matrix, the second state vector estimate, and the second state error covariance matrix and generates the combined state vector estimate and a corresponding combined state error covariance matrix,
   wherein the third filter comprises a prediction processor which generates a fed back predicted state vector estimate on the basis of the combined state vector estimate and a predicted state error covariance matrix on the basis of the combined state error covariance matrix, wherein the predicted state vector estimate and the predicted state error covariance matrix are fed back to the first filter, the second filter, and the third filter, wherein the first filter determines the first state vector estimate by updating the fed back predicted state vector estimate with the received satellite positioning data, and wherein the second filter determines the second state vector estimate by updating the fed back predicted state vector estimate with the received vehicle sensor data.

2. The method according to claim 1,
wherein the vehicle sensor data comprise a velocity measured by an odometer of the vehicle.

3. The method according to claim 1,
wherein the vehicle sensor data comprise a yaw rate measured by a gyroscopic sensor of the vehicle.

4. The method according to claim 1,
wherein the vehicle sensor data comprise a steering angle of the vehicle.

5. The method according to claim 4,
wherein the steering angle is measured by a power steering controller of the vehicle.

6. The method according to claim 1,
wherein the first filter determines the first state error covariance matrix on the basis of the fed back predicted error covariance matrix and a measurement error covariance matrix of the satellite positioning data.

7. The method according claim 1,
wherein the second filter determines the second state error covariance matrix on the basis of the fed back predicted state error covariance matrix and a measurement error covariance matrix of the vehicle sensor data.

8. The method according to claim 1,
wherein the third filter determines the combined state error covariance matrix on the basis of the fed back predicted state error covariance matrix.

9. The method according to claim 1,
wherein the third filter determines the combined state vector estimate on the basis of the fed back predicted state vector estimate and the fed back predicted state error covariance matrix.

10. The method according to claim 1,
wherein the prediction processor of the third filter is based on a state transition model with a linear state transition matrix.

11. A navigation system for a vehicle, comprising:
a satellite positioning device configured to obtain satellite positioning data; and
a Kalman filter configured to obtain a combined state vector estimate of the vehicle by combining the satellite positioning data and vehicle sensor data received from a number of vehicle sensors of the vehicle,
wherein the Kalman filter comprises
    a first filter configured to receive the satellite positioning data and generate a first state vector estimate of the vehicle and a corresponding first state error covariance matrix,
    a second filter configured to receive the vehicle sensor data and generate a second state vector estimate of the vehicle and a corresponding second state error covariance matrix, and
    a third filter configured to receive the first state vector estimate, the first state error covariance matrix, the second state vector estimate, and the second state error covariance matrix and generate the combined state vector estimate and a corresponding combined state error covariance matrix, wherein the third filter comprises a prediction processor configured to generate a predicted state vector estimate on the basis of the combined state vector estimate and a predicted state error covariance matrix on the basis of the combined state error covariance matrix, wherein the Kalman filter comprises a feedback arrangement configured to feed back the predicted state vector estimate and the predicted state error covariance matrix to the first filter, the second filter, and the third filter, wherein the first filter is configured to determine the first state vector estimate by updating the fed back predicted state vector estimate with the received satellite positioning data, and wherein the second filter is configured to determine the second state vector estimate by updating the fed back predicted state vector estimate with the received vehicle sensor data.

12. The navigation system according to claim 11,
wherein the sensor data comprise a velocity measured by an odometer of the vehicle.

13. The navigation system according to claim 11,
wherein the vehicle sensor data comprise a yaw rate measured by a gyroscopic sensor of the vehicle.

14. The navigation system according to claim 11,
wherein the vehicle sensor data comprise a steering angle of the vehicle.

15. The navigation system according to claim 14,
wherein the steering angle is measured by a power steering controller of the vehicle.

16. The navigation system according to claim 11,
wherein the first filter is configured to determine the first state error covariance matrix on the basis of the fed back predicted error covariance matrix and a measurement error covariance matrix of the satellite positioning data.

17. The navigation system according to claim 11,
wherein the second filter is configured to determine the second state error covariance matrix on the basis of the fed back predicted state error covariance matrix and a measurement error covariance matrix of the vehicle sensor data.

18. The navigation system according to claim 11,
wherein the third filter is configured to determine the combined state error covariance matrix on the basis of the fed back predicted state error covariance matrix.

19. The navigation system according to claim 11,
wherein the third filter is configured to determine the combined state vector estimate on the basis of the fed back predicted state vector estimate and the fed back predicted state error covariance matrix.

20. The navigation system according to claim 11,
wherein the prediction processor of the third filter is based on a state transition model with a linear state transition matrix.

21. A vehicle comprising a navigation system and a number of vehicle sensors providing vehicle sensor data, the navigation system comprising:
a satellite positioning device configured to obtain satellite positioning data; and
a Kalman filter configured to obtain a combined state vector estimate of the vehicle by combining the satellite positioning data and the vehicle sensor data received from the vehicle sensors of the vehicle,
wherein the Kalman filter comprises
    a first filter configured to receive the satellite positioning data and generate a first state vector estimate of the vehicle and a corresponding first state error covariance matrix, a second filter configured to receive the vehicle sensor data and generate a second state vector estimate of the vehicle and a corresponding second state error covariance matrix, and a third filter configured to receive the first state vector estimate, the first state error covariance matrix, the second state vector estimate, and the second state error covariance matrix and generate the combined state vector estimate and a corresponding combined state error covariance matrix, wherein the third filter comprises a prediction processor configured to generate a predicted state vector estimate on the basis of the combined state vector estimate and a predicted state error covariance matrix on the basis of the combined state error covariance matrix, and wherein the Kalman filter comprises a feedback arrangement configured to feed back the predicted state vector estimate and the predicted state error covariance matrix to the first filter, the second filter, and the third filter, wherein the first filter is configured to determine the first state vector estimate by updating the fed back predicted state vector estimate with the received satellite positioning data, and wherein the second filter is configured to determine the second state vector estimate by updating the fed back predicted state vector estimate with the received vehicle sensor data.

* * * * *